Figure 1A:
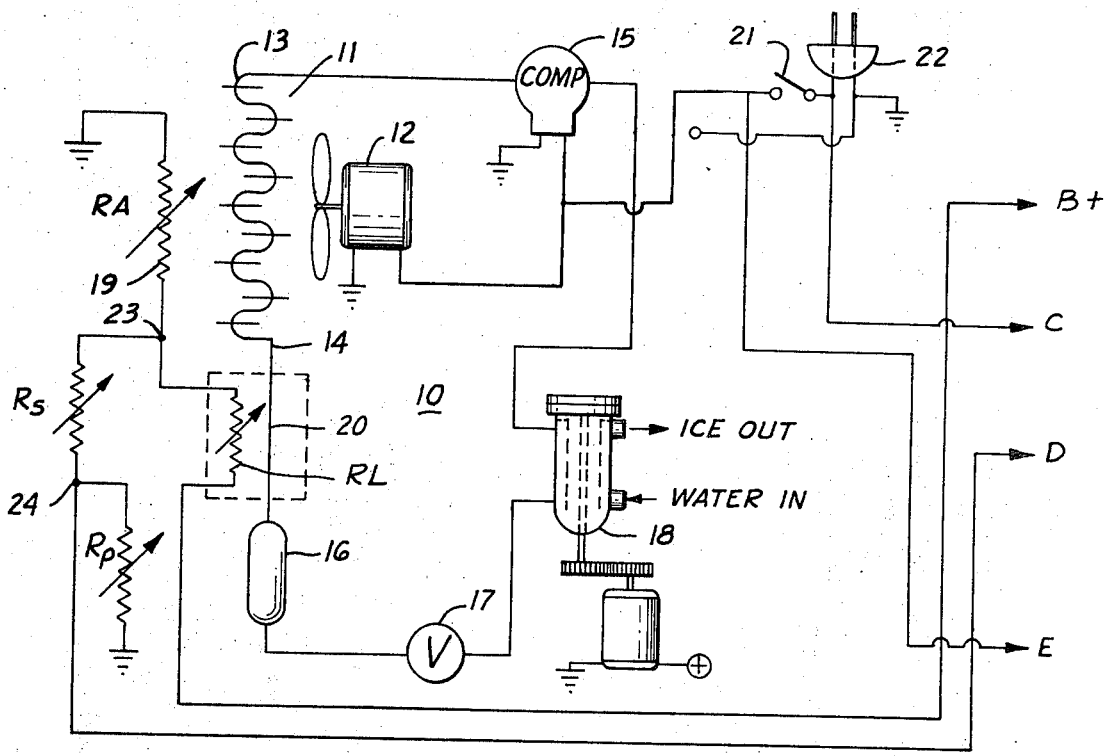

United States Patent [19]
McAshan, Jr.

[11] 3,707,851
[45] Jan. 2, 1973

[54] REFRIGERATION SYSTEM EFFICIENCY MONITOR

[75] Inventor: Robert B. McAshan, Jr., Houston, Tex.

[73] Assignee: Machine Ice Co., Houston, Tex.

[22] Filed: Oct. 28, 1970

[21] Appl. No.: 84,837

[52] U.S. Cl. .......................62/125, 62/129, 62/130, 165/11, 236/94
[51] Int. Cl. ...........................................F25b 49/00
[58] Field of Search........62/125, 127, 129, 130, 158, 62/208, 209; 165/11

[56] References Cited

UNITED STATES PATENTS

| | | | |
|---|---|---|---|
| 3,002,226 | 10/1961 | Warthen | 165/11 X |
| 3,415,071 | 12/1968 | Kompelien | 62/158 |
| 3,127,754 | 4/1964 | Mobarry | 62/158 |
| 2,037,155 | 4/1936 | Stuart | 62/209 |
| 3,220,206 | 11/1965 | Armentrout et al. | 62/127 |

Primary Examiner—William F. O'Dea
Assistant Examiner—P. D. Ferguson
Attorney—Hyer, Eickenroht, Thompson & Turner

[57] ABSTRACT

A monitor for monitoring and comparing the efficiency of operating conditions in a refrigeration system is disclosed. The monitor includes a first and second sensing means, such as thermistors, for sensing and comparing the values of two conditions in the system, such as an ambient temperature condition and the temperature of the refrigerant in the system, where these temperatures have a known relationship. A first alarm signal or indication is provided when the difference between these temperatures exceeds a predetermined amount, and a second alarm signal or indication is provided when the differences between these temperatures is less than a predetermined amount. The monitor also includes a delay circuit for delaying the application of voltage to the mechanism until a preset period after start up of said refrigeration system, and an alarm is also given in the event electric power is lost to the refrigeration system.

23 Claims, 4 Drawing Figures

INVENTOR.
ROBERT B. McASHAN, JR.
BY Hyer, Eickenroht,
Thompson, & Turner
ATTORNEYS

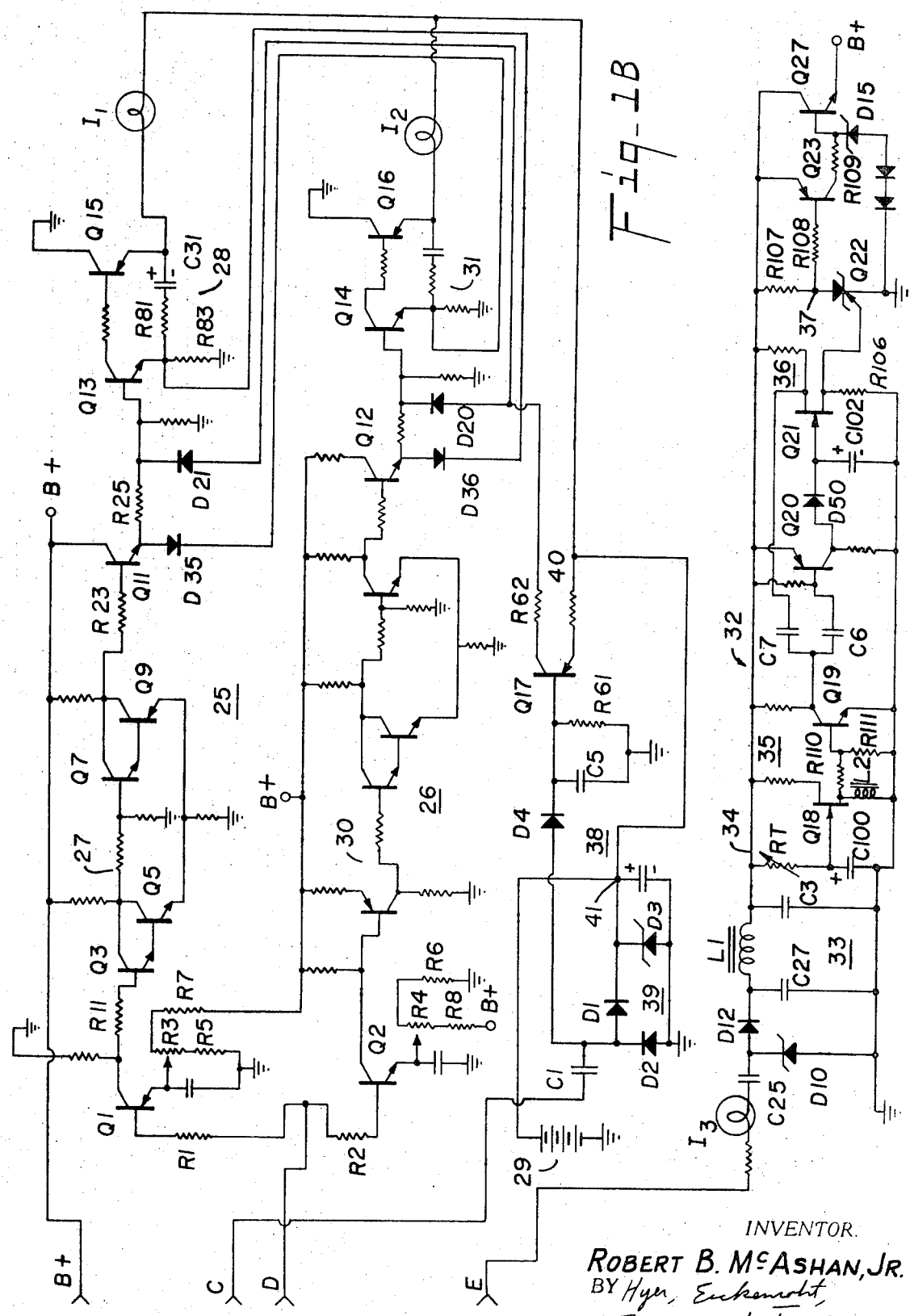

REFRIGERATION SYSTEM EFFICIENCY MONITOR

This invention relates to a refrigeration system efficiency monitor, and in one of its aspects to such a monitor in which the relationship between at least two operating conditions of the system are monitored and compared, and a continuous indication of this relationship is provided.

Many refrigeration system monitors or alarms have been provided which give an alarm signal when the refrigeration system becomes inoperative, or when some unusual condition which is indicative of a malfunction exists in the system. In such systems the alarm given is an indication that the system must be shut down and a repairman called, and generally means that one or more of the components in the system is defective. These alarms do not provide for continual efficiency monitoring which is designed to discover unusual conditions in the refrigeration system well before malfunction of some component occurs or before it is actually necessary to shut down the system. Monitoring the efficiency of the system is particularily important in refrigeration systems as many conditions that exist, such a low or high amount of refrigerant, a clogged condenser, or a dirty filter can lead to component breakdown if not detected early, but can be corrected with little disruption of service if discovered when they begin to cause some change in operating efficiency of the system. Also, in many refrigeration systems, such as commercial ice making machines, or commercial freezers, shut down, repair, and loss of service time and loss of production incidental to shut down and repair and because of the necessary re-start period, generally means lost revenue, and possible loss of perishables. Thus, it is highly desirable that such shut downs be avoided or minimized where possible, and that service calls be scheduled on a more timely basis rather than after a breakdown.

Also, most refrigeration system alarms merely signal the state of one condition in the system without reference as to how the rest of the system is functioning. Thus, the repairman only knows that a certain component is either good or bad or that a certain pressure or temperature is high or low, and he has to independently relate this condition to other conditions in the system in order to evaluate the performance of the whole system.

It is thus an object of this invention to provide a refrigeration system efficiency monitor which provides an alarm in response to an abnormal condition in the refrigeration system prior to the need for system shut-down or repair.

Another object of this invention is to provide such a monitor wherein more information is given concerning the condition of the refrigeration system than with previous refrigeration system monitors or condition alarm mechanisms.

It is a further object of this invention to provide such monitor in which the relationship between two or more conditions in the system is monitored and deviations in this relationship from normal are indicated.

It is a further object of this invention to provide such a monitor in which distinctive indications of different deviations in this relationship are provided.

It is another object of this invention to provide such a monitor in which a system temperature is continuously compared to an ambient temperature and distinctive indications are provided when the difference between these temperatures is greater than a predetermined amount, and when those temperature are less than a predetermined amount.

It is another object of this invention to provide an efficiency monitor requiring no entry into the sealed refrigeration system.

One of the most perplexing problems in refrigeration systems maintenance is the frequency of service calls made on systems in which power has been inadvertently lost, resulting in hours or days of disrupted service, and it is another object of this invention to provide such a monitor including an alarm which provides another distinctive indication when electric power to the refrigeration system is disrupted.

Also, it is desirable that when the refrigeration system is turned on that the monitor not be activated until the system has reached its normal operating conditions, and that this be done without the necessity of the operator first turning on the refrigeration system and then returning several minutes later to turn on the monitor. Also, the time necessary for many refrigeration systems to reach their normal operating state will vary with the prevalent weather conditions.

It is thus another object of this invention to provide such a monitor in which the monitoring of the condition of the refrigeration system is automatically delayed until a predetermined period after the refrigeration system has been turned on.

It is another object of this invention to provide such a delay which is automatically varied to compensate for changes in weather conditions or outside room temperatures.

These and other objects are accomplished in accordance with this invention by providing a monitor or alarm mechanism having a first means responsive to a ambient first condition, such as an ambient air temperature around a refrigeration system, and a second means responsive to a second condition in the refrigeration system having a known relationship to the ambient first condition. For example, the second condition may be the temperature of a circulating liquid refrigerant at some point in the system and this temperature can be sensed by a thermistor. Since variations in the relationship between the ambient first condition and the second condition are indicative of the effective heat rejection of the refrigeration system, the mechanism of this invention also includes a third means responsive to variations in the relationship of the refrigeration system conditions being monitored and providing a first indication or alarm when this relationship varies in excess of a certain amount in one direction, and a second indication or alarm distinctive of the first indication when this relationship varies in excess of a certain amount in the opposite direction. For example, if the refrigeration system is operating normally and the temperature differential between an ambient air temperature and a temperature of the liquid cooling medium is 20°, then the monitor alarm mechanism of the present invention may provide an indication on a red light when this differential exceeds 21°, and an indication on a green light when this differential is less than 19°. By proper selection of the point at which each of the indications will register, the system operator can be alerted of a deviation from normal in the refrigeration system well in advance of the point where it represents system breakdown. Also, depending on which color light is on he knows whether the temperature difference being monitored is high or low and can relate this to various types of malfunctions. Also, if desired another sensing means may be installed on another element such as the evaporator to indicate a change in evaporator load in concert with the other two sensors.

Another novel aspect of this invention is that a switching means is provided that responds to interruption of electric power to the refrigeration system to give a third distinctive indication when power to the refrigeration system has been interrupted.

Also, the invention includes a delay circuit connected between the source of electric power to the refrigeration system and the monitor so that the application of power to operate the alarm mechanism is automatically delayed until some predetermined period after the time that the refrigeration system is turned on. The delay period can be set for the appropriate period and the operator need only turn on the refrigeration system and the monitor will be automatically turned on after the initial start up period, and will be subsequently turned on each time any automatic device turns on the refrigeration system.

The delay circuit also includes means, such as a thermistor, which responds to outside refrigeration system air temperature or weather conditions to vary the period of delay accordingly.

Figures 2, 3:
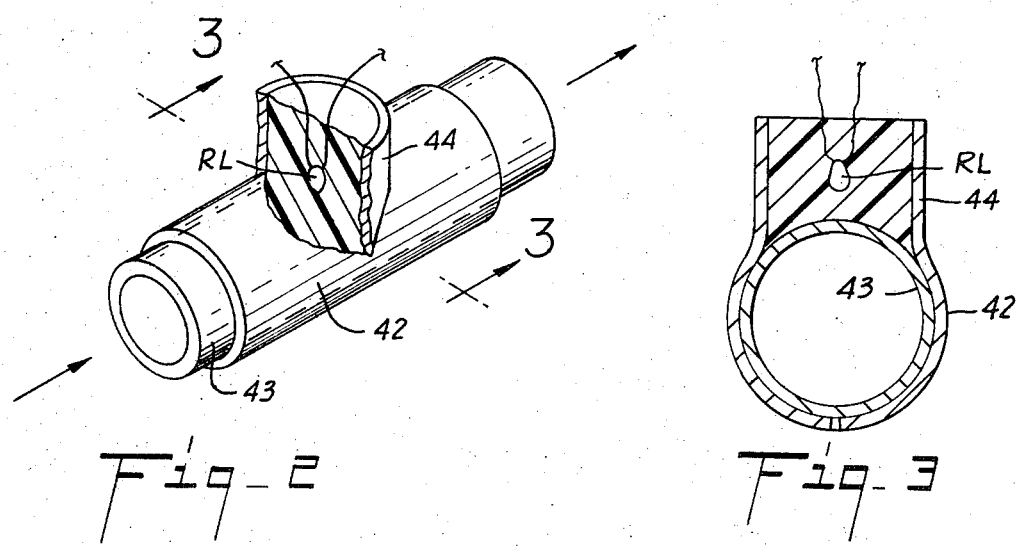

In the drawings, wherein like reference numerals are used throughout to designate like parts, and wherein is illustrated a preferred and exemplary embodiment of the invention, FIG. 1A is a schematic diagram of a typical refrigeration system utilizing the present invention, FIG. 1B is a schematic diagram of the preferred circuitry of the monitor constituting this invention;

FIG. 2 is a perspective view, including a partial cutout, illustrating a representative form of a connector for providing a thermal connection between a thermistor and liquid refrigerant passing through the refrigeration system of FIG. 1, and FIG. 3 is a sectional view taken at 3—3' in FIG. 2.

Referring to FIG. 1, a refrigeration system 10 is illustrated as utilizing the invention. System 10 is an ice maker having a closed system in which a cooling medium, or refrigerant is circulated in heat exchange with air and water from which ice is formed. It is to be understood that system 10 is merely illustrative of the type of refrigeration system which may employ the present invention and that the present invention is adaptable for use on all types of refrigeration or air conditioning systems employing the same or different cooling mediums. Also, while specific temperatures in system 10 are monitored and compared by the present invention, the present invention may be used to monitor and compare other variable conditions in the system. As used herein, the term "condition" refers to the specific temperature, pressure or other measurable factor at particular points in the refrigeration system, the value of which has some relationship to the condition of the refrigeration system.

Refrigeration system 10 includes a condenser 11 through which air is drawn by a fan 12. Condenser 11 includes an inlet 13, an outlet 14, a compressor 15 connected to the inlet side of condenser 11, and a receiver 16 and expansion valve 17 connected to the outlet side thereof. Expansion valve 17 and compressor 15 are connected together through an evaporator or ice maker 18 through which water passes to be frozen. System 10 thus forms a closed loop and liquid-gaseous refrigerant is circulated through the system to act as the primary cooling medium. Refrigerant enters inlet 13 in a gaseous state and gives up heat in condenser 11 to the air forced over condenser 11, and emerges at outlet 14 in a liquid state. In the description that follows of the present invention and by way of illustration of the present invention, the ambient temperature of the air as it enters the condenser 11 before heat exchange with the refrigerant will be sensed and compared with the temperature of the liquified refrigerant at or near outlet 14. System 10 is connected to a source of A.C. electrical power (not shown) through a switch or thermostat 21 and a plug 22.

The ambient air temperature is sensed by a first means, illustrated as a thermistor RA which responds to the temperature of the ambient air entering into condenser 11 and provides an electrical voltage proportional to this temperature. The temperature of the liquid refrigerant is sensed by a second means illustrated as a thermistor RL, which responds to the temperature of the refrigerant at or near outlet 14 and provides a second electrical voltage proportional to this temperature. Thermistor RA is mounted adjacent condenser 11 at 19 so that it is responsive to the ambient air temperature as it enters the condenser 11, and thermistor RL is mounted as hereinafter described in more detail at point 20 near outlet 14 where it is responsive to the temperature of the liquid refrigerant. These thermistors have the characteristic that their effective electrical resistance increases with a decrease in temperature, and decreases with an increase in temperature. Thermistors RA and RL form part of a balanced voltage divider network which includes variable resistors $R_s$ and $R_p$. One terminal of thermistor RL is connected to a regulated voltage source or B+ and one terminal of thermistor RA is connected to a low electrical potential reference point, such as ground. Thermistors RA and RL are connected together at their other terminals at point 23, and variable resistors $R_s$ is connected between point 23 and variable resistor $R_p$ which is connected to ground.

When system 10 is operating properly throughout its range of operating temperatures, the temperature differential between the ambient air and the temperature of the liquid refrigerant at outlet 14 will generally be within a range specified by the manufacturer. For example, in one refrigeration system using this invention the manufacturer has specified the following differentials:

| Ambient Temp. °F | Liquid Temp. °F | Difference | |
| --- | --- | --- | --- |
| 50 | 65 | 15° | |
| 70 | 82 | 12° | |
| 90 | 100 | 10° | (A) |
| 110 | 116 | 6° | |

Thus, at any operating temperature of the system, if this differential is varied from by any substantial amount then it is likely that some malfunction is occurring in the system. By way of example if the ambient temperature is 50°, but the difference between it and the liquid temperature is 13.5° or 16.5° instead of 15°, then, in each case, the operator should be alerted that an abnormal condition exists.

The values of thermistors RA and RL and resistors $R_s$ and $R_p$ are selected so that when system 10 is functioning normally the values of $[(RA)(R_s+R_p)]/(RA+R_s+R_p)$ and Thermistor RL are equal. Thus, if the B+ voltage applied to thermistor RL is 6 volts, the voltage at point 24 will be approximately 3 volts. The effective resistance of both thermistors RA and RL will change in response to variations in the ambient air temperature and the refrigerant liquid temperature. However, with the voltage divider network shown and with the proper setting of variable resistors $R_s$ and $R_p$, when system 10 is operating normally in the temperature ranges set out in Table A, the effective resistance of the thermistors will vary so that the voltage at point 24 is still approximately three volts. If either the ambient or liquid temperature varies so that the temperature difference therebetween is less than or exceeds the specified difference of Table A, then the voltage at point 24 will then either more or less than three volts, indicating a possible problem in system 10.

Thermistors RA and RL are preferably selected so that they have substantially the same effective resistance when thermistor RA is at some operating temperature of the ambient air in the mid range of the normal operating temperature, for example 77°, and thermistor RL is at the corresponding normal temperature for the cooled liquid coolant, for example 85°. In order to compensate for the fact that neither the usual refrigeration system or the thermistors used have completely linear relationships throughout the temperature ranges involved, $R_s$, which is a small resistance, is adjusted to compensate for nonlinearites in the high temperature ranges, and $R_p$, which is a higher resistance, is adjusted to compensate for nonlinearites in the lower temperature ranges. In the circuit illustrated in FIGS. 1A and 1B a value of 30 ohms for $R_s$ is used and a value of 236,000 ohms is used for $R_p$. When the temperatures monitored are high, the resistances of thermistors RA and RL will be relatively low, so that $R_s$, although small, will have some effect on the voltage at point 24. When the temperatures are low, then the resistances of RA and RL will be high and $R_s$ will have little effect but $R_p$ will effect the voltage at point 24.

The voltage at point 24 and on line D in FIG. 1A thus bears a relationship to the condition of refrigeration system 10. In the example given, if at or near 3 volts, then the system is operating normally. If above or below this figure by more than just a nominal amount, some malfunction or abnormal condition is indicated.

Means is also provided which responds to the voltage on line D to provide a first indication when this voltage exceeds its nominal value by some predetermined amount, and a second indication distinctive of the first indication when this voltage is less than the nominal voltage by a certain amount. As illustrated in FIG. 1B this means includes two independent power circuits 25 and 26 each for powering a distinctive indicating means, such as respectively a green light bulb $I_1$, and a red light bulb $I_2$. Each of circuits 25 and 26 are connected at their inputs to line D. Green light $I_1$ is caused to flash when the voltage on line D is some predetermined value below the nominal three volts, indicating that the difference between ambient and liquid temperatures is lower than normal, and red light $I_2$ is caused to flash when the voltage on line D is above the nominal 3 volts, indicating that the difference between ambient and liquid temperatures is higher than normal.

Low temperature differential indicator power circuit 25 is coupled to line D through a current limiting resistor $R_1$ connected to the base of a PNP transistor $Q_1$. $Q_1$ has the characteristic that when the voltage on line D is at some value from slightly less than 3 volts and above, then it is cut off and does not conduct. The temperature difference at points 19 and 20 may fall to some point below its normal value before a problem in the system is indicated. Thus, $Q_1$ is biased so that it is not driven to conduction until the voltage on line D reaches some predetermined level below 3 volts corresponding to a temperature differential on the low side greater than normal. For example, within the range of temperature differentials between ambient air and liquid coolant set out in Table A, the difference indicated may vary by as much as plus or minus 1.0° at 70° ambient and by higher amounts at the other temperature indicated before a problem in the refrigeration system is indicated. Thus, $Q_1$ is set to conduct when the voltage on line D is at some value below three volts which represents at 70° ambient a greater than 1.0° drop in the temperature differential between points 19 and 20. The point of conduction of $Q_1$ is determined by the voltage at line D. The emitter voltage of $Q_1$ is determined by the tap setting of $R_3$. Resistors $R_3$, $R_5$, and $R_7$ constitute a voltage divider between B+ and GND. $R_3$ is preferably a variable resistor so that the emitter voltage may be varied to permit conduction of $Q_1$ at different voltage levels on line D less than 3 volts.

Transistor $Q_1$ is connected through resistor $R_{11}$ to a Schmitt trigger 27 comprising transistors $Q_3$, $Q_5$, $Q_7$, and $Q_9$. When transistor $Q_1$ is not conducting the transistor combination $Q_7$–$Q_9$ is normally on so that the voltage at the collector of $Q_9$ is low, and the transistor combination $Q_3$–$Q_5$ is normally off. When $Q_1$ conducts, Schmitt trigger 27 switches states causing the voltage at the collector of $Q_9$ to go high and $Q_3$ and $Q_5$ to turn on. The collector of $Q_9$ is connected to the base of a transistor $Q_{11}$ which is an emitter follower through a resistor $R_{23}$ and the change of state of Schmitt trigger 27 causes the voltage at the emitter of transistor $Q_{11}$ to raise. The emitter of $Q_{11}$ is connected through a resistor $R_{25}$ to an oscillator circuit 28 including transistors $Q_{13}$ and $Q_{15}$, and when the voltage at the emitter of $Q_{11}$ is high, oscillator 28 will be driven and will oscillate at a repetition rate determined by an RC timing circuit including resistors $R_{81}$ and $R_{83}$ and capacitor $C_{31}$. A series of pulses will be thus provided at the rate of the oscillator. Light $I_1$ is connected on one side to the emitter of $Q_{15}$ and on the other side to a D.C. battery 29, and as $Q_{15}$ conducts its emitter is conducted to ground causing the lamp $I_1$ to light. Lamp $I_1$ will thus flash at the repetition rate of oscillator 28.

With the exception of the input section the high temperature differential indicator power circuit 26 is identical to circuit 25, and includes a Schmitt trigger 30 coupled by an emitter follower $Q_{12}$ to an oscillator 31 which causes red light $I_2$ to flash when a higher than normal temperature differential between points 19 and 20 is present.

The input section of circuit 26 includes a transistor $Q_2$ having its base connected through a current limiting resistor $R_2$ to line D. Transistor $Q_2$ is a NPN transistor which is normally biased off when the voltage on line D is from a value slightly higher than 3 volts to less values. As the temperature differential between ambient air and liquid coolant increases to some point beyond normal variations, such as 1.0° when ambient air is at 70°, then the base of $Q_2$ becomes more positive until $Q_2$ is caused to conduct. The point of conduction is determined by the values of resistors $R_2$, $R_4$, $R_6$, and $R_8$, the latter three forming a voltage divider between B+ and the emitter of $Q_2$. Resistor $R_4$ is preferably a variable resistor so that the point of conduction of $Q_2$ can be varied. When $Q_2$ conducts circuit 26 functions to cause light $I_2$ to flash as described with respect to the operation of circuit 25.

In order to insure that when one of lights $I_1$ or $I_2$ is flashing that the other light will not be inadvertently flashed, diodes D35 and D36 are connected respectively between the emitters of $Q_{11}$ and $Q_{12}$ to the emitters of $Q_{14}$ and $Q_{13}$. Thus, when the voltage at the emitter of $Q_{13}$ is high a voltage will be conducted through D35 to bias transistor $Q_{14}$ off, and when the voltage at the emitter of $Q_{12}$ is high a voltage will be conducted to transistor $Q_{13}$ to bias it off.

Also, shown in FIG. 1B is a power supply circuit 32 which provides a source of regulated B+ voltage to thermistor RL and the power circuits 25 and 26. Since it is desired that the monitoring provided by this invention not begin until some time after the refrigeration system has been turned on, it is preferred that power supply circuit 32 automatically delay the application of B+ for a predetermined period after system 10 has been turned on.

Power supply circuit 32 is connected to a source of A.C. electrical power through line E, switch 21 and plug 22. An input section 33 of power supply 32 includes a voltage regulating zener diode $D_{10}$, a rectifier diode $D_{12}$ and a filter section including capacitors $C_3$, $C_{27}$ and filter choke $L_1$. A lamp $I_3$, some color other than red or green, is connected in series in line E to provide an indication that plug 22 is connected to a source of A.C. power with line E connected to the ungrounded side of the A.C. A regulated D.C. voltage of approximately 13 volts is thus provided at the output of section 33 and on line 34. Line 34 is the voltage supply line for the remainder of power supply 32 to be described.

Connected to the output of section 33 in power supply 32 is an oscillator 35 responding to the voltage on line 34 to provide a series of pulses at a predetermined repetition rate. In the preferred embodiment illustrated in FIG. 1B oscillator 35 includes unijunction transistor $Q_{18}$, transistor $Q_{19}$, and their associated components. The gate of unijunction transistor $Q_{18}$ is preferably connected to line 34 though a thermistor RT and to ground through a charging capacitor $C_{100}$.

Thermistor RT is preferably placed where it is exposed to outside refrigeration system temperatures, such as atmospheric weather conditions, and its resistance is thus varied with changing weather conditions to change the voltage on the gate of unijunction transistor $Q_{18}$. Thermistor RT, like thermistors RA and RL has a negative temperature coefficient. Thus, differing repetition rates of oscillator 35 can be provided to automatically vary the delay of power supply 32 to suit differing weather conditions. Of course, if the temperatures in the environment of systems 10 remains fairly constant, RT can be a fixed resistor of suitable value or a variable resistor. The repetition rate for oscillator 35 is determined by the values of RT and $C_{100}$.

When the current at the gate of $Q_{18}$ reaches its peak point current, $Q_{18}$ fires and $C_{100}$ is discharged through a choke $L_2$ connected between the second base of $Q_{18}$ and ground. $Q_{19}$ is thus caused to conduct providing a negative pulse at the collector of $Q_{19}$. The collector of $Q_{19}$ is connected through a capacitor $C_6$ to the base of a PNP transistor $Q_{20}$ in which the pulse is inverted and rectified and supplied through a diode $D_{50}$ to a timing capacitor $C_{102}$ which in the embodiment illustrated is 200 mfd. The gate of a unijunction transistor $Q_{21}$, forming a second oscillator 36, is connected to $C_{102}$ and $Q_{21}$ conducts to discharge $C_{102}$ when the voltage on $C_{102}$ reaches the proper level so that the peak point current of the gate of $Q_{21}$ is reached. Each pulse supplied to $C_{102}$ through diode $D_{50}$ is accumulated by capacitor $C_{102}$ until the firing voltage is reached so that $Q_{21}$ does not fire until oscillator 35 has cycled through a large number of repetitions. A resistor $R_{106}$ is connected to the second base of $Q_{21}$ and discharges $C_{102}$ to ground when $Q_{21}$ fires. Thus, the repetition rate of oscillator 35 is set by RT and $C_{100}$ so that the firing voltage on $C_{102}$ is built up to the proper level at the end of the desired delay period.

The first base of $Q_{21}$ is connected through a capacitor $C_7$ to the collector of $Q_{19}$ so that a small negative pulse is provided to this base for each cycle of oscillator 35. This small negative pulse has the effect of substantially reducing the peak point current required at the gate of $Q_{21}$ to cause it to fire.

An SCR, $Q_{22}$, is connected by its power electrodes across the voltage on line 34, through a resistor $R_{107}$ connected at point 37 to $Q_{22}$. The gate electrode of $Q_{22}$ is connected to the second base of $Q_{21}$. $Q_{22}$ operates as a latch and when $Q_{21}$ fires $Q_{22}$ switches to cause current to conduct through $R_{107}$, thus lowering the voltage at point 37. The base of a transistor $Q_{23}$ is connected through resistor $R_{108}$ to point 37, and through its emitter to line 34. The collector of transistor $Q_{23}$ is connected through a resistor $R_{109}$ to a zener diode $D_{15}$ and the base of a transistor $Q_{27}$. Thus, when $Q_{22}$ fires, $Q_{23}$ conducts and a regulated voltage at the value of zener diode $D_{15}$ is maintained on the base of $Q_{27}$. The collector of $Q_{27}$ is connected to line 34, and its emitter provides a B+ output for power supply 32 which is, for example, a regulated 6 volts D.C., representing a voltage drop of 7 volts in $Q_{27}$.

Another novel feature of this invention is the provision of a means for automatically signaling loss of operating power to refrigeration system 10. In FIG. 1B this means is illustrated in its preferred form as a control circuit 38 including an input power supply section 39 and an output switching circuit 40. Alternating current voltage to section 39 is obtained directly from the source of supply voltage to refrigeration system 10 at plug 22 through line C and capacitor $C_1$. This voltage is rectified by diodes $D_1$ and $D_2$ and regulated to a 6 volt D.C. at point 41 by a zener diode $D_3$.

Also connected to point 41 is the 6 volt D.C. battery 29 which provides the voltage for flashing lamps $I_1$ and $I_2$. The regulated voltage at point 41, when A.C. power is supplied to system 10, thus provides a charging voltage to battery 29.

Switching circuit 38 includes a transistor $Q_{17}$ which is connected through its collector and a resistor $R_{62}$ to diodes $D_{21}$ and $D_{20}$. Diodes $D_{21}$ and $D_{20}$ are connected respectively to the base of $Q_{13}$ in lamp control circuit 25, and the base of $Q_{14}$ in lamp control circuit 26. The emitter of transistor $Q_{17}$ is connected to point 41 and its base is connected through a diode $D_4$ and capacitor $C_1$ to line C. Diode $D_4$ rectifies the A.C. voltage on line C and it is filtered at the base of $Q_{17}$ by $C_5$ and $R_{61}$ so that when the A.C. power to systems 10 is on, a bias voltage sufficient to bias transistor $Q_{17}$ off is provided at the base of $Q_{17}$. However, when the A.C. supply voltage is interrupted, this bias is removed and transistor $Q_{17}$ conducts causing a driving voltage to be conducted through diodes $D_{20}$ and $D_{21}$ to drive transistor oscillators 28 and 31 simultaneously causing lamps $I_1$ and $I_2$ to flash. Since the A.C. input to power supply 32 is off no B+ is provided to circuits 25 and 26 and the biasing voltages through $D_{35}$ and $D_{36}$ will not be present. Thus, the lamp oscillators 28 and 31 will be free running. A visual indication of disruption of power to refrigeration system 10 is thus provided which is distinctive of the indications provided when temperatures in the system are high or low.

FIGS. 2 and 3 show a preferred means for mounting thermistor RL adjacent to outlet 14 and at point 20. A standard copper tubing tee fitting 42 is split along the bottom and it is placed around tubing 43 which conducts refrigerant from outlet 14. Thermistor RL is suspended in the neck 44 of tee 42 so as not to physically contact the sides of the tee or tubing 43, by encasing it in a thermal conductive material 45 such as polyester resin with 10% $TiO_2$ filler. Of course, other suitable means may be provided for mounting thermistor RL adjacent outlet 14.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A monitor for monitoring and comparing different operating conditions in a refrigeration system to indicate an abnormal system condition, wherein said different operating conditions in said refrigeration system differ nonlinearly as said conditions are varied between lower and upper limits comprising, in combination: first means responsive to an ambient first condition in said refrigeration system; second means responsive to a second condition in said refrigeration system having a known relationship to said ambient first condition to provide a second electrical signal having an electrical value proportional to said second condition, said first and second electrical signals having a nonlinear relationship between limits proportional to said lower and upper limits; third means responsive to said first and second means and providing a substantially constant third electrical signal when the difference between said first and second electrical signals between said limits proportioned to said lower and upper limits represents substantially normal deviations in said conditions; and fourth means for providing first indication when said third electrical signal is greater than a first predetermined value to represent such an abnormal system condition, and a second indication distinctive of said first indication when said third electrical signal is less than a second predetermined value different from said first predetermined value to also represent an abnormal system condition whereby said first and second indications are not provided in response to substantially normal deviations between said different operating conditions.

2. The monitor of claim 1 wherein said first and second sensing means are thermistors.

3. The monitor of claim 1 wherein said last mentioned means includes means producing an electrical control voltage proportional to the difference between said first and second electrical signals, and a first indication control circuit responsive to said control voltage and providing said first indication when said control voltage exceeds a preset level, and a second indication control circuit responsive to said voltage and providing said second indication when said voltage is less than a second preset level.

4. The monitor of claim 3 further including voltage supply means providing an electrical supply voltage, and wherein said means producing an electrical control voltage includes a voltage divider network connected to said voltage supply means, said first and second sensing means being thermistors connected to and forming a part of said voltage divider network.

5. The monitor of claim 4 wherein said voltage divider network includes means connected to one of said thermistors to vary the effective resistance thereof at different resistance levels.

6. The monitor of claim 5 wherein said last mentioned means includes a first relatively low resistance resistor connected to said one thermistor, and a second relatively high resistance resistor connected to said first resistor.

7. The monitor of claim 4 wherein said voltage supply means includes a voltage delay circuit for delaying the application of said electrical supply voltage to said voltage divider network until a preset time after said refrigeration system has been activated.

8. the monitor of claim 7 further including means for varying said delay automatically in response to outside refrigeration system temperature conditions.

9. The monitor of claim 7 further including means providing an input voltage to said delay circuit in response to the activation of said refrigeration system, and wherein said delay circuit includes a first oscillator responding to said input voltage to provide a series of pulses at a predetermined repetition rate, a second oscillator responsive to said pulses and providing an output pulse upon receipt of a predetermined number of said pulses, and switching means connected to said input voltage means and the output of said second oscillator and providing said supply voltage in responses to said output pulse.

10. The monitor of claim 9 wherein said second oscillator includes an unijunction transistor, and further including means connected between said first and second oscillators for reducing the peak point firing current of said unijunction.

11. The monitor of claim 9 further including voltage regulating means connected to said switching means to provide a substantially constant supply voltage.

12. The monitor of claim 9 further including a thermistor connected between said input voltage means and said first oscillator, said thermistor adapted to be exposed to outside refrigeration system temperature conditions to automatically vary said repetition rate in response to variations in said outside refrigeration system temperature conditions.

13. The monitor of claim 1 further including delay means for automatically applying a supply voltage to said first and second means a predetermined time after activation of said refrigeration system.

14. The mechanism of claim 13 further including a thermistor connected between said input voltage means and said first oscillator, said thermistor adapted to be exposed to outside refrigeration system temperature conditions to automatically vary said repetition rate in response to variations in said outside refrigeration system temperatures.

15. The monitor of claim 1 wherein said first and second means are resistors the resistance of which varies in response to changes in said first and second conditions.

16. The monitor of claim 15 wherein said first and second conditions are temperatures and each of said resistors has a negative temperature coefficient.

17. The monitor of claim 1 wherein said first and second means are disposed exteriorly of said closed refrigerant system.

18. A monitor for monitoring and comparing different operating conditions in a refrigeration system to indicate an abnormal system condition, wherein said refrigeration system includes a heat exchanger between a first relatively cool cooling medium and a second relatively warm cooling medium to cool said second medium, while warming said first medium, comprising, in combination: first means responsive to the temperature of said first medium to provide a first electrical signal having an electrical value proportional to said temperature of said first medium; second means responsive to the temperature of said second medium in said refrigeration system to provide a second electrical signal having an electrical value proportional to said temperature of said second medium; and third means responsive to said first and second means and providing a first indication when the difference between the electrical values of said first and second electrical signals and between the temperatures of said first and second mediums, is greater than a first predetermined value to represent such an abnormal system condition, and second indication distinctive of said first indication when said difference is less than a second predetermined value different from said first predetermined value to also represent an abnormal system condition, whereby said first and second indications are not provided in response to substantially normal deviations between said different operating conditions.

19. the monitor of claim 18 wherein said heat exchanger is a condenser and said first cooling medium is air passed over said condenser, and said second medium is a liquid-gaseous coolant passing through said condenser and changing from a gaseous state at the inlet.

20. A monitor for monitoring and comparing different operating conditions in a refrigeration system to indicate an abnormal system condition, comprising, in combination: first means responsive to an ambient first condition in said system to provide a first electrical signal having an electrical value proportional to said ambient first condition in said refrigeration system; second means responsive to a second condition in said refrigeration system having a known relationship to said ambient first condition to provide a second electrical signal having an electrical value proportional to said second condition; and third means responsive to said first and second means and providing a first indication when the difference between the electrical values of said first and second electrical signals is greater than a first predetermined value to represent such an abnormal system condition, and a second indication distinctive of said first indication when said difference is less than a second predetermined value different from said first predetermined value to also represent an abnormal system condition whereby said first and second indications are not provided in response to substantially normal deviations between said different operating conditions; delay means for automatically applying a supply voltage to said first and second means a predetermined time after activation of said refrigeration system; and means for varying said delay automatically in response to outside refrigeration system temperature conditions.

21. The monitor of claim 20 wherein said delay means is a delay circuit including means providing an input voltage to said circuit in response to the activation of said refrigeration system, a first oscillator responding to said input voltage to provide a series of pulses at a predetermined repetition rate, a second oscillator responsive to said pulses and providing an output signal upon receipt of a predetermined number of said pulses, and switching means connected to said input voltage means and the output of said second oscillator and switching to provide said supply voltage in response to said output signal.

22. The monitor of claim 21 wherein said second oscillator includes a unijunction transistor and further including means connected between said first and second oscillators for reducing the peak point firing current of said unijunction.

23. A monitor for monitoring and comparing different operating conditions in a refrigeration system to indicate an abnormal system condition, said refrigeration system being connected to a source of electrical power, comprising, in combination: first means responsive to an ambient first condition in said system to provide a first electrical signal having an electrical value proportional to said ambient first condition in said refrigeration system; second means responsive to a second condition in said refrigeration system having a known relationship to said ambient first condition to provide a second electrical signal having an electrical value proportional to said second condition; and third means responsive to said first and second means and providing a first indication when the difference between the electrical values of said first and second electrical signals is greater than a first predetermined value to represent such an abnormal system condition, and second indication distinctive of said first indication when said difference is less than a second predetermined value different from said first predetermined value to also represent an abnormal system condition whereby said first and second indications are not provided in response to substantially normal deviations between said different operating conditions; and means connected to said source of electrical power and said third means and responding to the interruption of said power to said refrigeration system to alternatively provide said first and second indications.

* * * * *